US011953443B2

(12) United States Patent
McIntyre et al.

(10) Patent No.: US 11,953,443 B2
(45) Date of Patent: Apr. 9, 2024

(54) HIGH POWER ACTIVELY Q-SWITCHED DOWNHOLE LIBS ANALYSIS SYSTEMS

(71) Applicant: Energy, United States Department of, Washington, DC (US)

(72) Inventors: Dustin Langdon McIntyre, Washington, PA (US); Daniel Allen Hartzler, Westover, WV (US)

(73) Assignee: Energy, United States Department of, Washington, DC (US)

( * ) Notice: Subject to any disclaimer, the term of this patent is extended or adjusted under 35 U.S.C. 154(b) by 0 days.

(21) Appl. No.: 17/504,619

(22) Filed: Oct. 19, 2021

(65) Prior Publication Data
US 2023/0121266 A1 Apr. 20, 2023

(51) Int. Cl.
*G01N 21/71* (2006.01)
*B23K 26/0622* (2014.01)
*G01J 3/02* (2006.01)

(52) U.S. Cl.
CPC ....... *G01N 21/718* (2013.01); *B23K 26/0624* (2015.10); *G01J 3/0208* (2013.01); *G01J 3/0218* (2013.01)

(58) Field of Classification Search
None
See application file for complete search history.

(56) References Cited

U.S. PATENT DOCUMENTS

| 4,047,117 A * | 9/1977 | Tuchyner | H01S 3/11 359/335 |
| 6,529,540 B1 * | 3/2003 | Demmer | H01S 3/1075 372/27 |
| 7,688,443 B2 * | 3/2010 | Rieger | H01S 3/127 356/318 |
| 8,786,840 B1 * | 7/2014 | Woodruff | G01J 3/44 372/17 |
| 2005/0185260 A1 * | 8/2005 | Galvanauskas | G02F 1/39 359/341.1 |
| 2013/0128257 A1 * | 5/2013 | Stettner | H01S 3/09415 356/4.01 |

(Continued)

OTHER PUBLICATIONS

Jain, J. et al. "LIBS sensor for sub-surface CO2 leak detection in carbon sequestration." Sensors & Transducers 214.7 (2017): 21 (Year: 2017).*

(Continued)

*Primary Examiner* — Dominic J Bologna
*Assistant Examiner* — Roberto Fabian, Jr.
(74) *Attorney, Agent, or Firm* — Aaron R. Keith; Charles Lutzow; Michael J. Dobbs

(57) ABSTRACT

An actively Q-switched laser induced breakdown spectroscopy (LIBS) probe, utilizing an optical fiber, a pump beam transmitted through the optical fiber, a coupler, and a lens for collimating the pump beam. The actively Q-switched laser, coupled to a sensor which provides information to a computer that controls a high voltage pulser providing a pulse to a Pockels cell located within the laser which can selectively cause the laser to pulse, resulting in high energy pulses and a second lens for focusing the output pulse such that it creates a plasma or spark. The light from the spark is captured and directed back through an optical system to remote equipment for elemental and/or molecular analysis.

19 Claims, 9 Drawing Sheets

(56) References Cited

U.S. PATENT DOCUMENTS

2014/0339412 A1* 11/2014 Speck ................ G01N 21/718
　　　　　　　　　　　　　　　　　　　　　　　　250/269.1
2016/0141827 A1*　5/2016 Valiente .............. H01S 3/1643
　　　　　　　　　　　　　　　　　　　　　　　　372/41
2016/0301184 A1* 10/2016 Williams ............. H01S 3/1312
2016/0336709 A1* 11/2016 Manni ............... H01S 3/08081

OTHER PUBLICATIONS

Bol'shakov, A. et al. "Laser ablation molecular isotopic spectrometry for rare isotopes of the light elements." Spectroscopy 29.6 (2014): 30-39 (Year: 2014).*

Li, Shuo, et al. "Development of a compact vertical-cavity surface-emitting laser end-pumped actively Q-switched laser for laser-induced breakdown spectroscopy." Review of Scientific Instruments 87.3 (2016): 033114 (Year: 2016).*

* cited by examiner

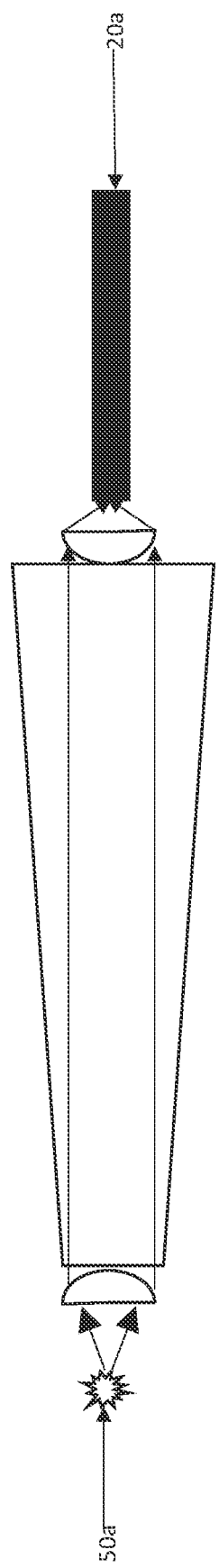
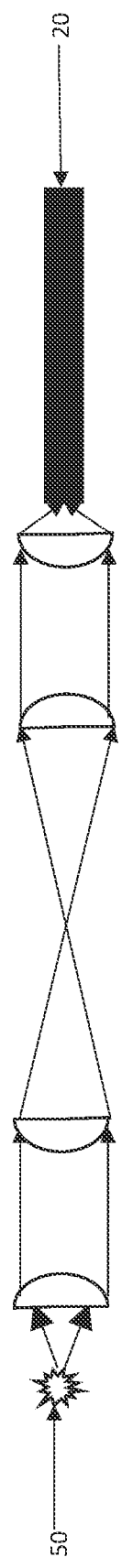
Fig. 5a
Prior Art
Fig. 5b

HIGH POWER ACTIVELY Q-SWITCHED DOWNHOLE LIBS ANALYSIS SYSTEMS

GOVERNMENT INTERESTS

The United States Government has rights in this invention pursuant to Contract No. DE-FG02-16CH99999 between the U.S. Department of Energy (DOE) and National Energy Technology Laboratory (Pittsburgh).

FIELD OF THE INVENTION

The present invention relates to probes for exploring geologic formations using laser induces breakdown spectroscopy, and feedback sensors for chemical and other separations processes.

BACKGROUND OF THE INVENTION

Carbon capture and storage in underground geologic formations is a currently an accepted way to reduce carbon dioxide ($CO_2$) emissions on the environment. And it is indeed a growing industry, as are many related to improving the environment. A great deal of effort has gone into understanding different aspects of carbon capture technologies from the efficient capture of the $CO_2$ from the flue gas stream to the transportation over long distances to the injection sites, to the injection and long-term retention of the $CO_2$ underground. Such a large effort has gone into the early stages of this program that there needs to be a way of knowing that the $CO_2$ will remain in place and not simply leak out into the atmosphere. A detailed study of the formations prior to injection provides half of the solution and the constant monitoring of the environment closely associated with the injection formation forms the second half of the complete solution. Monitoring must be conducted over a wide range of environments from ground water monitoring to air quality monitoring to nearby production well monitoring. Thus, a device that can be deployed in multiple environments is preferred; laser induced breakdown spectroscopy (LIBS) is a potential solution to some of these problems.

When using laser induced breakdown spectroscopy to measure elemental species in water not all elements can be sufficiently excited and sensed unless the laser output pulse energy far exceeds the 20 mJ level. However, current downhole LIBS sensor system cannot generate enough power to reach the above-mentioned power levels. Typically, these probes use an all-solid state monolithic laser system to be deployed down hole. Unfortunately, this type of technology has a fundamental output pulse energy limitation that depends on the combination of optical elements and pumping power. This limitation places the maximum output pulse energy for the laser system well below desired thresholds without sacrificing other design elements. Using the current state of the art, to significantly increase the output pulse energy, the geometry and input characteristics of the LIBS system would have to change by orders of magnitude. Thus, there is a need for a LIBS system that can output significantly increased pulse energy be with little to no changes to the geometry or input characteristics.

SUMMARY OF THE INVENTION

In an embodiment this disclosure contemplates a laser induced breakdown spectroscopy (LIBS) probe. The LIBS probe is made up of at least an optical fiber, a pump beam transmitted through the optical fiber, and a coupler connected to the optical fiber. There is a first lens, connected to the coupler, having a predetermined shape and a coating. The first lens collimates the pump beam. An actively Q-switched laser is laser coupled to a sensor which provides information to a computer that controls a high voltage pulser. The high voltage pulser provides a pulse to a Pockels cell located within the laser which can selectively cause the laser to pulse, resulting in high energy pulses There is a second lens for focusing the output pulse such that it creates a plasma or spark.

In another embodiment this disclosure contemplates a laser induced breakdown spectroscopy (LIBS) probe being made up of at least an optical pumping source connected to an optical fiber, and an adjustable focus lens arrangement connected to at least one of the optical pumping source and the optical fiber. An actively Q-switched (AQSW) laser is connected to the adjustable focus arrangement. A sample area connected to at least the beam of the laser, a spectral emission control connected to at least one of the optical fibers and the optical pumping source. A selective mirror is located between the optical fiber and the actively Q-switched laser which selectively reflects a non-powering wavelength and directs the output to an AQSW control. The AQSW control selectively activates the AQSW laser based on a non-powering wavelength sent from the optical pumping source, allowing for remote control of the AQSW laser's output.

In another embodiment this disclosure contemplates a method for operating an actively Q-switched laser induced breakdown spectroscopy (LIBS) probe. The method having sever steps. Those may be the following. The method includes starting a topside control unit connected to the LIBS probe by an optical fiber. Then it proceeds to determining whether to use a previously loaded program and determining whether to use a previously used pump level. The method includes setting up a spectrometer to read information returned by the LIBS probe through the optical fiber, and determining pump frequency and duration, pulse pumping to the LIBS probe. Down hole there is a process for generating high energy pulses at the LIBS probe, the pulses producing high energy plasma, returning optical data on the higher energy plasma to the spectrometer through the optical fiber, and producing a measurement.

BRIEF DESCRIPTION OF THE DRAWINGS

Embodiments of the present invention are illustrated in the accompanying figures where:

FIG. 5a is a side view of the fiber output as practiced in the prior art.

FIG. 5b is a side view of the fiber output as according to an embodiment of the present Downhole LIBS system.

DETAILED DESCRIPTION OF THE INVENTION

The following detailed description provides illustrations for embodiments of the present invention. Those skilled in the art will recognize that other embodiments for carrying out or practicing the present invention are also possible.

Figure 1:
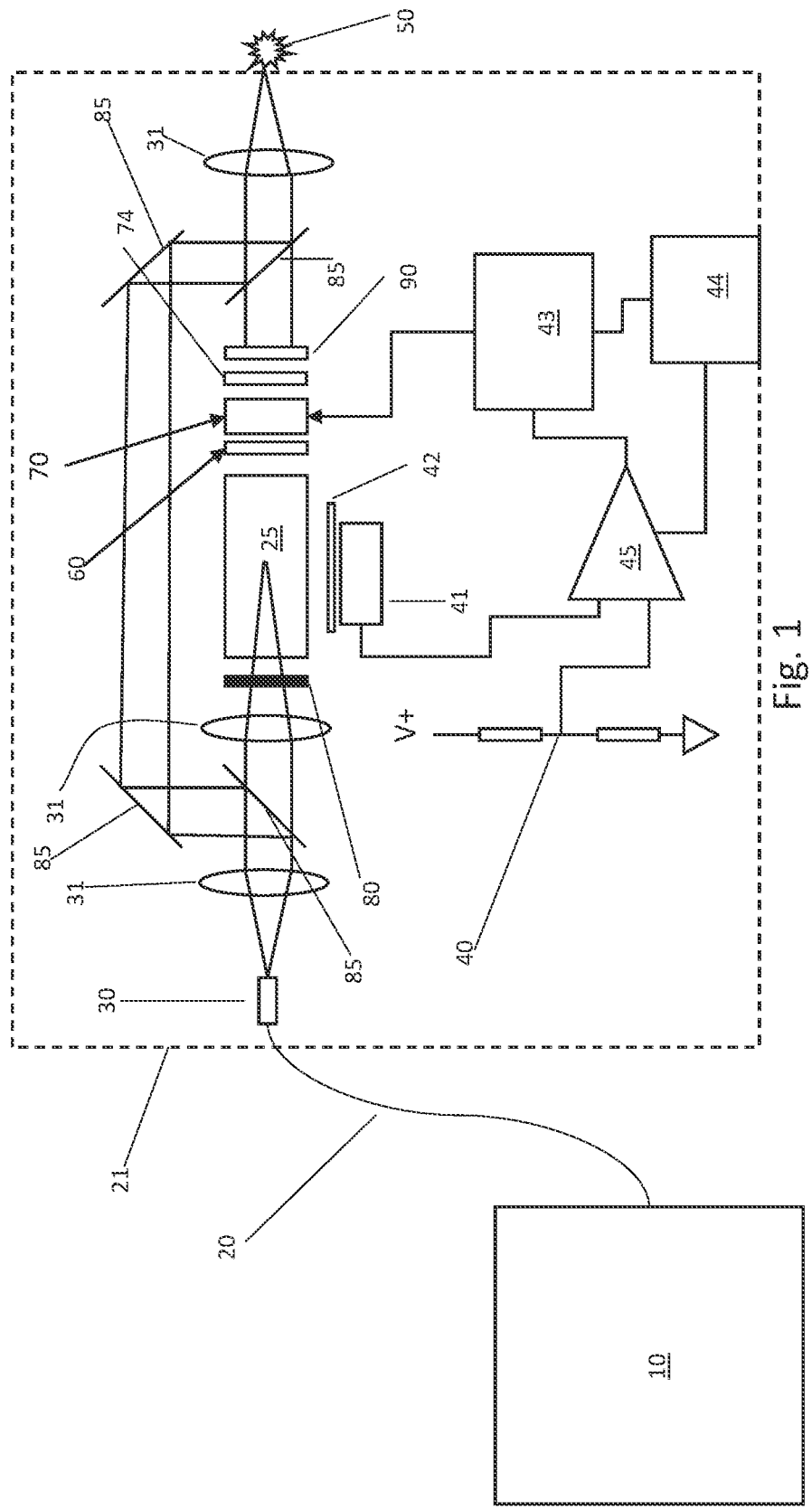
FIG. 1 is an embodiment of an Actively Q-switched Downhole LIBS system.

The present invention allows for remote, downhole, laser induced breakdown spectroscopy (LIBS) probe for the measurement of elemental species at energy levels that are not capable of being generated by other downhole LIBS devices. In addition, the invention can be used as a source for Raman spectroscopy. Therefore, the present invention contemplates an actively Q-switched downhole LIBS system as shown in FIG. 1, which is capable of significantly increased output pulse energy compared to previous devices with little to no changes to the size, geometry, or energy input, thus providing a newly optimized system for downhole spectroscopy. The higher pulse energy allows for the excitation of atomic species that are otherwise undetectable. This approach requires a more complicated electrical and optical arrangement as shown in FIGS. 1-5.

FIG. 1, illustrates an Actively Q-switched Downhole LIBS system. The system is made up of three main parts: a topside system 10, connected to an optical fiber 20, which connects to the downhole sensory system 21. Topside system 10 may contain an optical pump, for delivery of power through the fiber 20, a spectrometer, a control, memory, and a power source, which may preferably be a battery. The pump power ranges from 500 W to 10,000 W with a pulse width of 200-800 microseconds. The repetition rate can be higher (20-40 Hz) at the lower pump power levels and lower (once a minute to 1 Hz) at the higher pump power levels to compensate for overheating. Optical fiber 20 delivers optical pump power to the downhole system 21 at the fiber connection point 30. The fiber 20 can be silica core with a silica cladding but also could be a photonic crystal fiber or a sapphire fiber, or other materials with preferable characteristics.

At downhole system 21 the pump light is focused through lenses 31, through a high reflectivity mirror 80, and into the laser gain medium 25, which may be Nd atoms or any laser gain medium that produces acceptable results. The lenses 31 can be made of fused silica or fused quartz, they will be preferably spherical lenses where needed or plano-concave/plano-convex if necessary. Generally, BK-7 fused quartz spherical lenses can be utilized, however improvements in performance and/or cost can be achieved by the above-mentioned modifications. In some instances, the lenses 31 could be made to have parabolic shapes to help eliminate spherical and chromatic aberration. Lenses 31 could also be high quality molded lenses with shapes more complex than the simple parabolic shapes used to correct for aberrations, but this tends to reduce their power handling abilities due to the polymers used for the lenses, so is only used in certain applications.

Mirror 80 can be coated with Silicon, Titanium, Tantalum, Zirconium, Hafnium, Scandium, Niobium, oxides thereof, fluorides thereof or combinations thereof. More preferably, the coatings preferably comprise materials with various indices of refraction for example as $A_2O_3$, $Ta_2O_5$, $SiO_2$, $TiO_2$, $CaF_2$, $ZrO_2$, $BeO_2$, $MgF_2$, $LaF_3$ and $AlF_3$ or combinations thereof, or another preferable coating to selectively reflect or allow the passage of the chosen wavelengths (operation would include wavelengths in the range of 850-200 nm, and more specifically in most applications utilizes of the visible spectra 700-400 nm), of light pumped through fiber 20 into the laser gain medium 25. The mirror 80 serves to restrict light generated within the laser gain medium 25. In one, commonly utilized embodiment, the pump wavelength of 808 nm passes through mirror 80 and the laser wavelength 1064 nm is reflected. In general, the pump wavelength is a shorter, more energetic, wavelength which is allowed to pass through the mirror 80 and a longer, less energetic, output wavelength is reflected.

The pump power input induces excited states within the laser gain medium 25, a Pockels cell or Q-switch 70, in the actively Q-switched laser, delays lasing until a prescribed time, thus increasing the spontaneous fluorescence intensity of the gain medium and the potential output pulse energy level of the laser. One preferred embodiment utilizes a laser with output at 1064 nm, but lasers ranging from 200 nm to 1200 nm can be used.

Once sufficient light from the laser material fluorescence has shown upon the photodiode or sensor 41 then the manual setpoint voltage divider 40 (made up of sensor 41, filter 42, high voltage pulser 43, battery 44, and comparator 45) would be activated thereby causing the active Q-switch or Pockel's cell 70 to become transparent to properly polarized light. A polarizer 60, that matches the Q-switch polarization, is placed between the active media and the Q-switch 70 to ensure that a significant portion of the light that reaches the Q-switch 70 is of the right polarization. After being released by the Q-switch 70, the output may be passed through a quarter (¼) wave plate 74, output coupler 90, and lens 31 to ensure a focused high energy plasma 50 is produced. Mirrors 85, serve to selectively reflect the optical output generated by the high energy plasma 50 back to optical fiber 20, allowing for analysis by the topside system 10. These mirrors 85 are selectively coated to allow the wavelength emitted by the laser to pass through, and may preferably be coated with silver, gold, platinum, silica, titanium, $Al_2O_3$, or another preferable coating to selectively allow the passage or reflection of the chosen wavelengths of light emitted.

The system 21 is contained in a housing that can be submerged down a wellbore or simply suspended at any level along the way to take data. The downhole housing could be made of steel, aluminum, a hard durable plastic, or other such material, such that the material can withstand the pressure of being under water and can block scattered laser energy. The choice of such parts and their interchangeability depends on the specific implementation chosen and the elements being detected and can be adjusted according to the user as understood by those skilled in the art.

Depending on the temperature and pressure conditions encountered a miniaturized solid-state spectrometer can be placed alongside the excitation laser and have communications that go back topside for analysis. This system will be able to withstand the pressure, being all solid state, and will be able to operate well, and possibly better when exposed to the temperature of the down hole environment. To determine the presence of anthropogenic $CO_2$, either directly or indirectly, a high-resolution echelle, or a Czerny-Turner spectrometer can be employed at the topside system 10 to resolve the carbon isotope ratios and/or other spectroscopic features contained in the plasma emission light. Also, if laser wavelengths other than the fundamental and harmonics are needed for LIBS or Raman, an optical parametric oscillator can be integrated with the laser output to tune the desired wavelength output.

Figure 2:
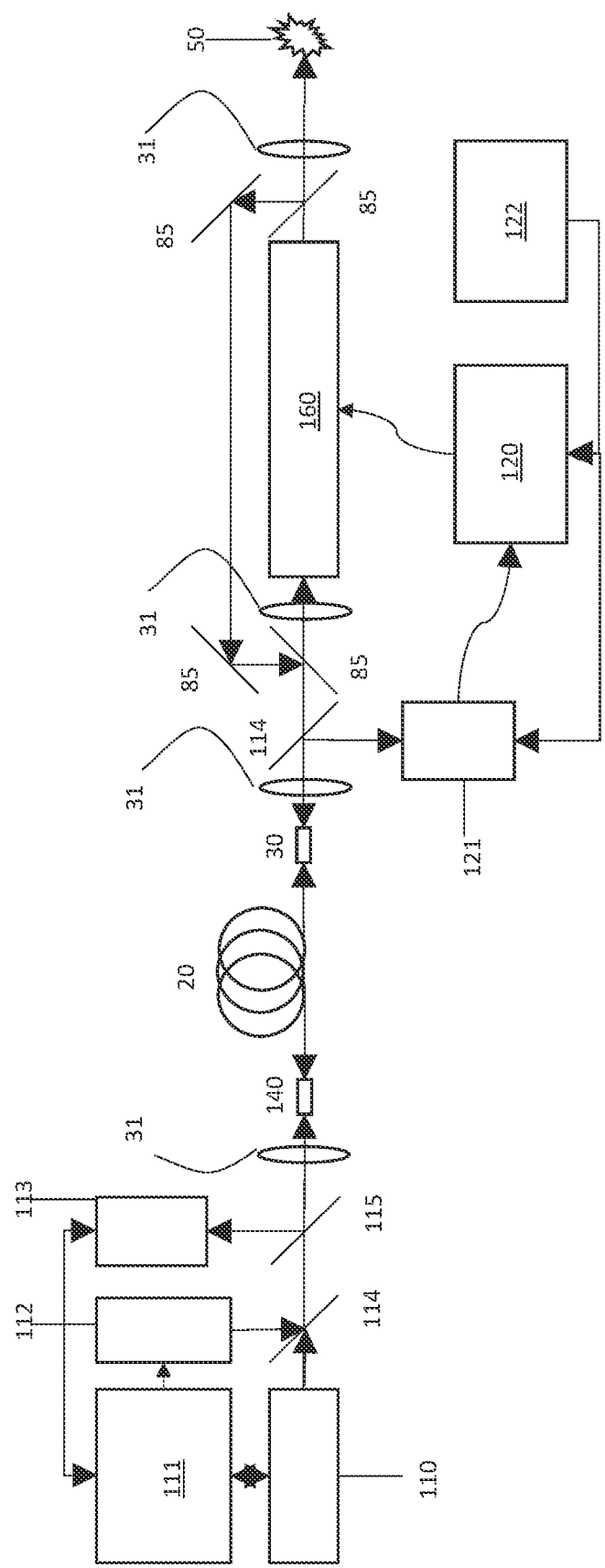
FIG. 2 is another embodiment of an Actively Q-switched Downhole LIBS system.

FIG. 2 illustrates another embodiment of the invention where an optical trigger 112 signal is initiated by the topside computer 111. This trigger selectively interacts with mirror 114 to enter fiber 20. Mirror 114 is designed to allow wavelengths emitted from pump 110 (typically 700-1000 nm) through and reflect the signal from trigger 112 which is of a different wavelength (preferably utilizing the telecom wavelength bands: O-band. E-band, S-band, C-band, L-band, and T/XL-band; these bands range from 1250 nm to 1700 nm) than the pump 110 so that it can be easily split off by mirror 114 and detected downhole by trigger 121 (powered by supply 122), to initiate the operation of the active Q-switch by AQSW control 120. In this embodiment, pumped light is passed through lenses 31 to AQSW Laser 160. The AQSW laser 160 is typically a Nd laser, mediated with a Pockels cell acting as the Q-switch, although other configurations are contemplated to detect alternative substances. Laser 160 also will utilize a quarter wave plate. When the signal is sent to trigger 121 AQSW control 120 sends the signal to fire the Q-switch and the laser output resulting in high energy laser output that is passed through lens 31 and is focused to produce a plasma emission 50. The timing of this signal sent by trigger 112 can be adjusted with respect to the pump 110 energy to vary the amount of energy stored in the laser's 160 gain medium and thereby control the output pulse's energy level.

The return path of the plasma emission light is defined initially by the light collected and collimated by lens 31. The light is then reflected off broadband reflectivity mirrors 85. Mirrors 85 are coated for broad band visible light reflectivity as well as antireflection coated for the pumping energy wavelength, and the AQSW laser output wavelength, which is not within the range of the plasma emission wavelengths as discussed above. After reflecting off mirrors 85, the returning light is focused by lens 31 into the optical fiber 20 end that is contained and held by connector 30. The distance between lens 31 and connector 30 can be adjusted and arranged (as shown in FIGS. 5a-d) dynamically producing an adjustable focus lens arrangement capable of maximizing the returning light captured by fiber 20. The plasma emission light is transmitted up the fiber where it emerges from the optical fiber 20 end that is held by connector 140. The light is captured and collimated by lens 31 and then the plasma emission light will then encounter mirror 115 which has been coated for the broad visible emission spectra, typically coated with silver, gold, platinum, silica, titanium, Al2O3, or another similar substance. Mirror 115 reflects most, if not all, of the plasma emission light toward the Czerny-Turner style spectrometer 113 where the light is captured, dispersed, and sensed. The spectrometer is connected to the computer 111 for a triggering interface and delay as well as for the transmission of data collected from the spectrometer 113 for display and analysis.

Figure 3:
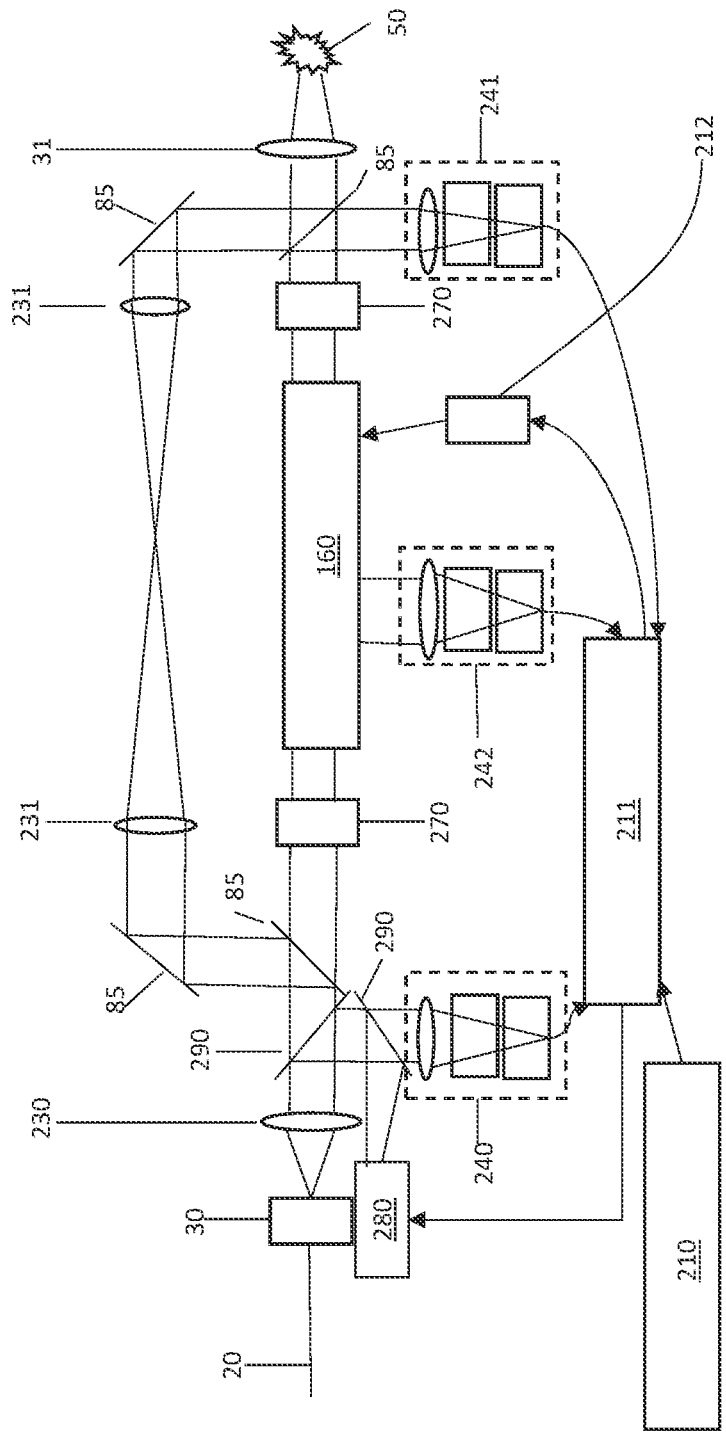
FIG. 3 is another embodiment of an Actively Q-switched Downhole LIBS system.

FIG. 3 is another embodiment of an Actively Q-switched Downhole LIBS system, that utilizes downhole sensors and processing system 211. The downhole system is powered by a battery 210, while the AQSW laser 160 is powered by a fiber optic cable 20 delivering pumped energy. Operationally, fiber optic 20 sends power to connection 30 which sends optical power through lens 230. Lens 230 is preferably a high optical quality bi-convex aspheric lens. This light passes through mirrors 290 & 85 which can be coated to selectively allow specific wavelengths through the mirrors. As such, multiple wavelengths can be sent from topside to both power the AQSW Laser 160, as well as function as signals for trigging the Q-switch, and high-intensity pulse 50. After light passes through a beam expander 270 it makes it to the AQSW laser 160. Beam expander 270 can be a set of fused quartz spherical lenses, one will be a long focal length bi-convex lens and the other will be a relatively short focal length bi-concave lens. Because of mirror 290, selected wavelengths of light are selectively passed to optical sensor 240, which may preferably also include a lens to focus the light. Sensors 240, 241, & 242 are similar in operation, but each allows the different bands of light through. Sensor 240 is matched with a filter to look at programming and communications. Sensor 241 will also have a filter to collect the laser output wavelength which is also preferably at 1064 nm. Sensor 242 will have a filter that only allows the AQSW laser fluorescence wavelength to pass (typically 1064 nm). Sensor 242 senses at time scales of 100's of microseconds and Sensor 241 senses at time scales of 10's of nanoseconds. This also allows light from the laser emitter 280 (output is in the telecom wavelengths, 1250 nm to 1700 nm) to be selectively reflected by mirror 290 and through lens 230 and back into the optical fiber 20 through the optical connector 221 and up to a topside apparatus similar to those discussed above. Thus, laser emitter 280 can selectively communicate information to topside control apparatuses. A sensor 241 receives a small fraction of the high peak power laser output, reflected from mirror 85, from the AQSW 160 which is transmitted through the output beam expander 270 and records this output waveform and energy level and this information is stored in the processor 211 until retrieval is desired by the operator. A sensor 242 receives fluorescence information feedback from the AQSW laser 160 and this information is used by the processor 211 to trigger the Pockels cell within the AQSW laser to produce the high peak power output. Sensors 240, 241, & 242 communicate with processor 211, which can selectively activate the high voltage circuit 212 (up to approximately 5000 volts, the circuit should be relatively low power) which then triggers the AQSW to fire a high intensity pulse through beam expander 270 and lens 31. The high intensity pulse excites the target material in the downhole system producing a plasma 50. The atomic emission and/or data from the plasma is emitted in all directions. A portion of which is back transmitted through the system where it is captured by lens 31, collimated and then reflected off the broad-spectrum mirror 85. Mirror 85 acts to reflect most, if not all, of the plasma emission. The plasma emission light is then directed off mirror 85 and through lenses 231 (lenses 231 can be made out of a polymer and molded into an aspheric shape, this shape preserves the focus-ability of the broad plasma emission, reduces chromatic aberration) and respectively then reflected off mirrors 85 where the light is focused into the optical fiber 20 for transmission to the surface by lens 230 through fiber connector 30.

Figure 4:
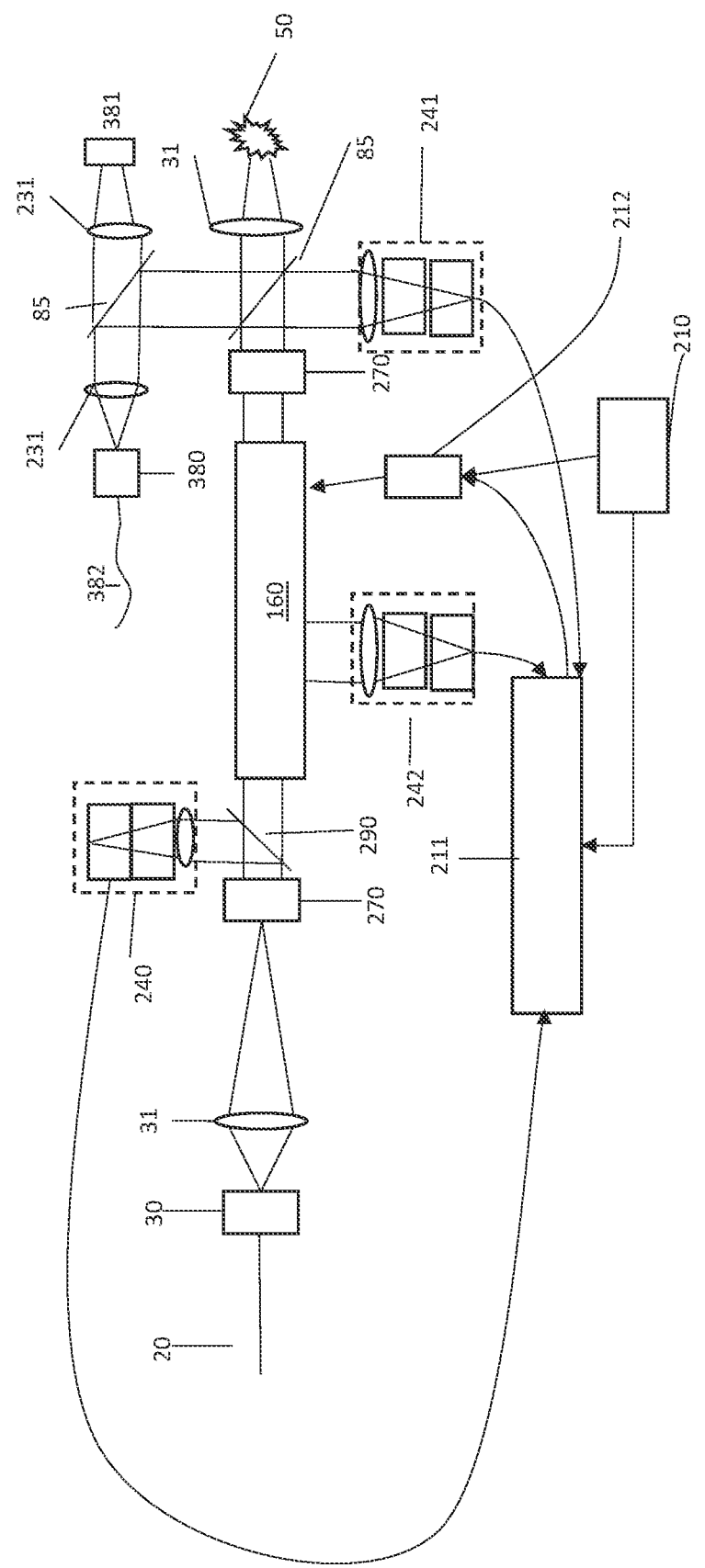
FIG. 4 is another embodiment of an Actively Q-switched Downhole LIBS system.

FIG. 4. Is a slightly simplified version of the downhole LIBS system of FIG. 3 with downhole processing that has a second optical fiber 382 for returning output data from the emitter 381. Emitter 381 is preferably a telecom LED or laser diode operating at one of the telecom wavelengths discussed above. As with other downhole LIBS systems discussed herein, optical energy is pumped from topside via fiber optic cable 20 to connection point 30. The beam is then sent through lens 31 to beam expander 270 and passed to the AQSW laser 160. Selective mirror 290 sends certain wavelengths to sensor 240 which communicates with processor 211. The energy transmitted down the optical fiber 20 can be in the form of pump power to actuate the AQSW 160 to produce a high peak power output or in the form of processor activation pulses to modify the processor operational characteristic or to initiate data transmission to the topside through the emitter 381. Processor 211 is powered by battery 210 and receives input from sensors 240, 241, 242. Sensor 242 receives fluorescence emission from AQSW laser 160. This fluorescence information from sensor 242 is used to determine the switching time of the Pockels cell, located within the AQSW 160, by way of the high voltage pulse from the high voltage system 212 which is triggered by the processor 211. In this embodiment, laser 160 pulses in response to signal from the high voltage signaler 212 and sends a high intensity beam through beam expander 270, and lens 31 generating a plasma 50. The plasma 50 produces optical emission that can be measured and provide elemental concentration information as well as Raman shift information from the materials that are impinged upon in the subsurface. This laser output pulse is reflected to sensor 241 by narrow spectrum, low reflectivity mirror 85. Mirror 85 will be coated on its first side by a low reflectivity coating that will work in the region of the AQSW laser output wavelength. Sensor 240 simply records the pump power waveform that is delivered to the AQSW and is stored in the processor for diagnostic purposes. Sensor 241 provides feedback to processor 211 regarding the shape and power level of the laser output pulse. The data from sensors 240, 241, 242, is stored in the processor until its retrieval and transmission to the topside as desired by the operator. The atomic emission and/or Raman shift information from the plasma 50 is collected by lens 31 and back transmitted through the system by first being reflected off the broad-spectrum coating side of mirror 85 then reflected off mirror 85 where the broad-spectrum information is focused into the secondary optical fiber 382 through the secondary optical fiber connector 380 by lens 231. If data download from the processor is initiated by the operator the data will be transmitted by emitter 381 which sends a signal through lens 231 where the light is collimated and passes through mirror 85, which is coated to allow the emitter wavelength to pass. The light from the emitter is then focused by lens 231 into connector 380, and this signal is then relayed to the through fiber 382 back to the topside apparatus.

Such downhole LIBS systems with their actively Q-switched laser output can then accumulate high amounts of intensity when generating the plasma for material analysis (as seen at 50) which can excite downhole materials and provide for advanced downhole fluid elemental concentration measurement and Raman shift measurement.

FIGS. 5a and 5b show side views of the plasma emission divergence as it travels through the return portion of the optical path to the fiber optic 20, 20a. FIG. 5a shows how unrestricted divergence from the larger plasma point source can induce optical losses by the time the light reaches the insertion optics for the optical fiber 20a. FIG. 5b shows how the addition of a pair of shorter focal length lenses can mitigate the divergence caused by the size of the plasma point source and its broad-spectrum emission that suffers from chromatic aberration caused using low-cost spherical lenses. Non-spherical lenses can be custom made or best form lenses can be used to minimize this divergence issue, however the use of these custom lenses with an aspherical shape will sometimes outweigh the costs of using two additional spherical lenses for these purposes.

Figure 5D:
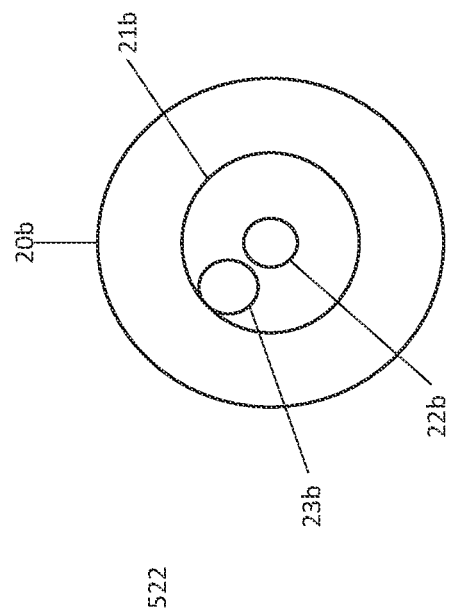
FIG. 5d is a cross sectional view of an embodiment of an optical fiber used in a Downhole LIBS system.
Figure 5C:
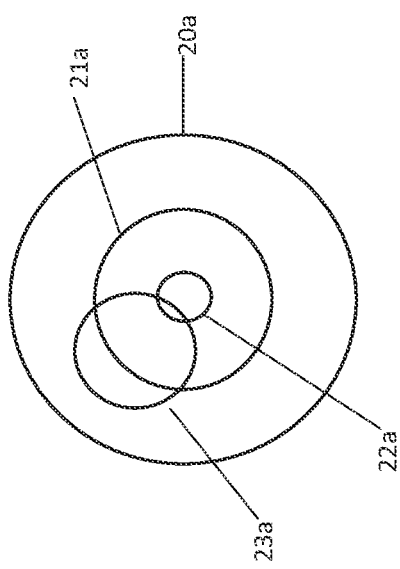
FIG. 5c is a cross sectional view of a prior art optical fiber used in a Downhole LIBS system.

FIG. 5c. shows the front face of the fiber 20a and the core 21a of the optical fiber. In this configuration two spot sizes are displayed on the face of the fiber. The first is the best possible diffraction limited spot size 22a of the plasma that could be theoretically transferred through a well-designed system. The second spot size 23a depicts the larger, lower photon density image produced by the simple system in FIG. 5a. This spot size is produced by a lens where some of the light has been lost due to the light falling outside its acceptance cone. Therefore, less light will be collected resulting in lower light levels that can be returned to the topside for analysis. The offset of the second spot 23a also indicates that the system can accept only a small amount of misalignment before the spot begins to leave the acceptance cone of the optical fiber core 21a leading to further potential light (data) losses. FIG. 5d depicts the same fiber face 20b with the same "best case scenario" of the diffraction limited spot size 22b (on core 21b). The difference shown is the smaller, well controlled, spot size 23b that is possible with the addition of the divergence control lenses shown in FIG. 5b. FIG. 5d also shows that with a smaller spot 23b size that the divergence-controlled system produces that the overall system is tolerant of more misalignment before data loss results and that the photon density will be higher by maintaining more light within the optical path. These figures (5a-d) demonstrate that the control of the divergence for the plasma light 50 (as opposed to 50a) to be analyzed provides more light to analyze as less is lost to divergence in the present invention (seen in FIGS. 5b & 5d). This also demonstrates that the spot size of the returning light is smaller and more controllable over a broad range of wavelengths.

Figure 6:
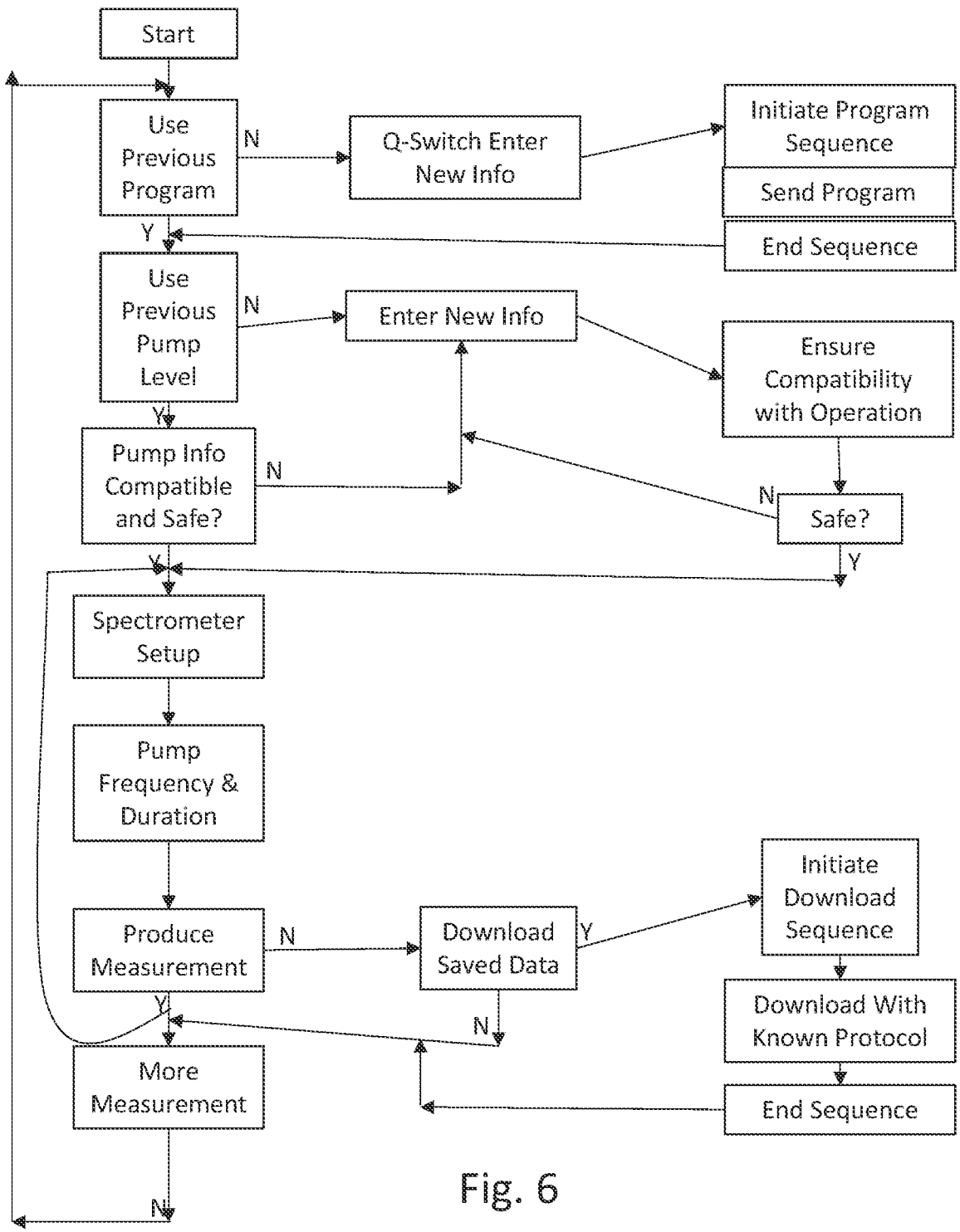
FIG. 6 is flowchart illustrating a control chart for topside unit operation of a Downhole LIBS system.

FIG. 6. flowchart illustrates a control chart and method 600 for topside unit 10 operation of a Downhole LIBS system, such as the downhole LIBS system 21 as shown in FIG. 1. The method 600 begins with step 601 starting a control unit for a downhole LIBS system according to this invention. Then the method 600 at step 602 decides between using a previously loaded program or entering new Q-switch information (step 610). If new information is needed step 615 of initiating a new program sequence sending the new program sequence, and then ending the program sequence proceeds. This would load a new set of Q-switch characteristics, if necessary, using a known optical communication protocol. The method 600, then decides at step 603 between using a previous pump level and entering new information (step 620). If new information is entered, the method 600 proceeds to step 625 ensuring the new information's compatibility and safety with operation of the downhole LIBS system 21. Once the pump level is determined, the method 600 proceeds to step 604 setting up the spectrometer. Then at step 605 the controller 10 begins determining pump frequency and duration. Once this is determined the controller 10 begins at step 607 producing a measurement. This is achieved through the downhole system 21 as described above. The downhole system 21 at step 630 returns measurements to the spectrometer. At the topside system 10, the system 10 at step 640 downloads the saved data by initiating a download sequence (step 641), downloading with a known protocol (step 642), then ending the sequence (step 643). The system 10 then can start step 608 producing measures for the user. The measures include resolving carbon isotope ratios located around the LIBS probe. Such protocols and setup operations are done in accordance with the specifications disclosed above.

Figure 7:
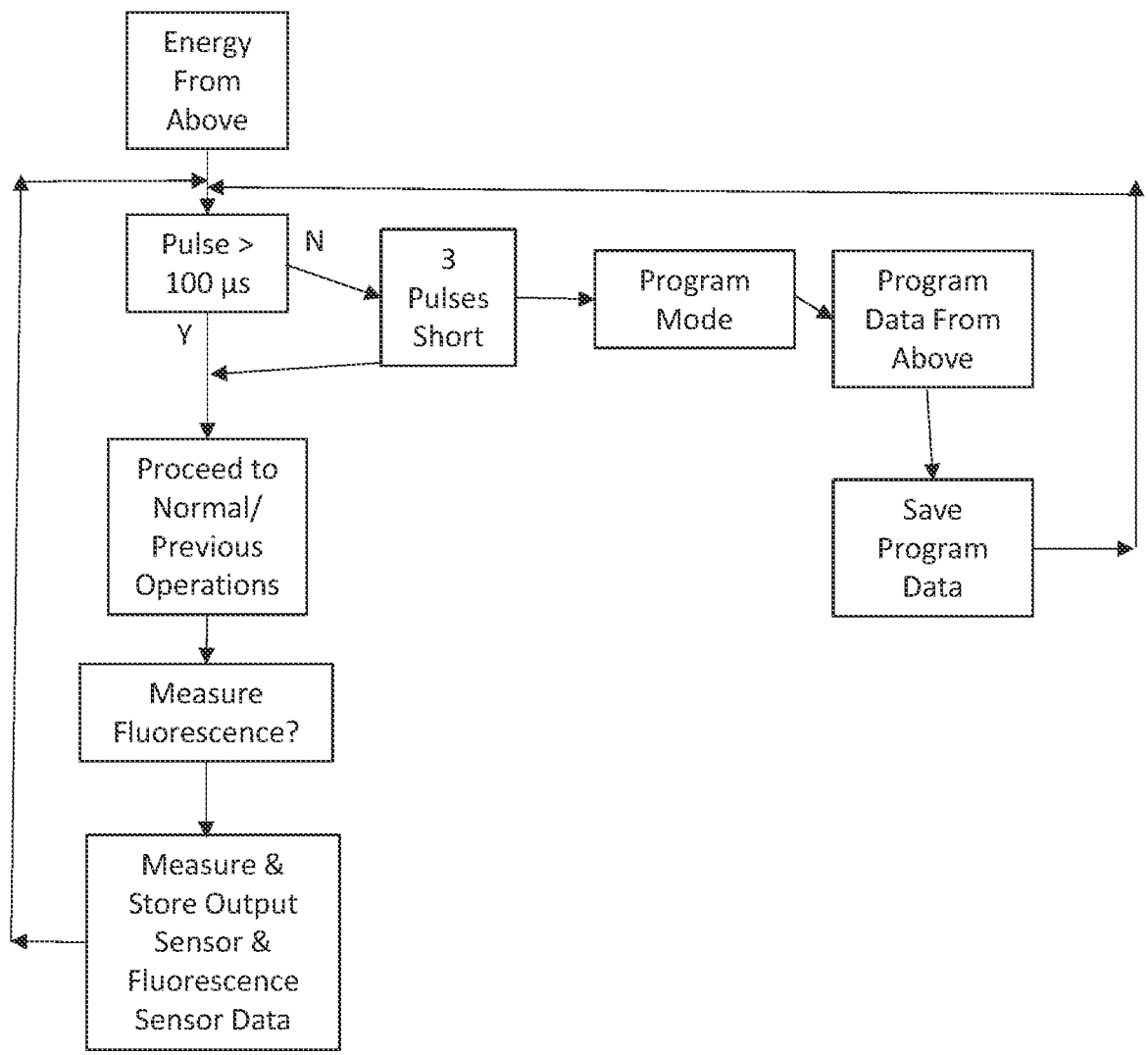
FIG. 7 is flowchart illustrating a control chart for downhole unit operation the LIBS system of FIG. 3.

Looking now to FIG. 7 a flowchart illustrating a control chart for downhole unit operation of the LIBS system in FIG. 3 is shown. In this method 700, power and instructions are delivered from the topside modules to the downhole LIBS system by fiber optic cable 20. Thus, it is initiated at step 701 receiving energy from the cable. At Step 705 the method determines whether the pulse is greater than 100 microseconds. If yes, at step 703 it proceeds to normal operation. At step 704 the system measures the fluorescence of the excited molecules, and at step 705 measures and stores the output and sensor data. The method then returns to the beginning. If the pulse was shorter than 100 microseconds, the system proceeds to step 710 of determining whether a series of 3 short pulses were received, if 3 short pulses were received, at step 715 the system goes into programing mode. Step 720 loads program data from the topside controller 110, and step 721 saves the program data and method 700 resets.

Figure 8:
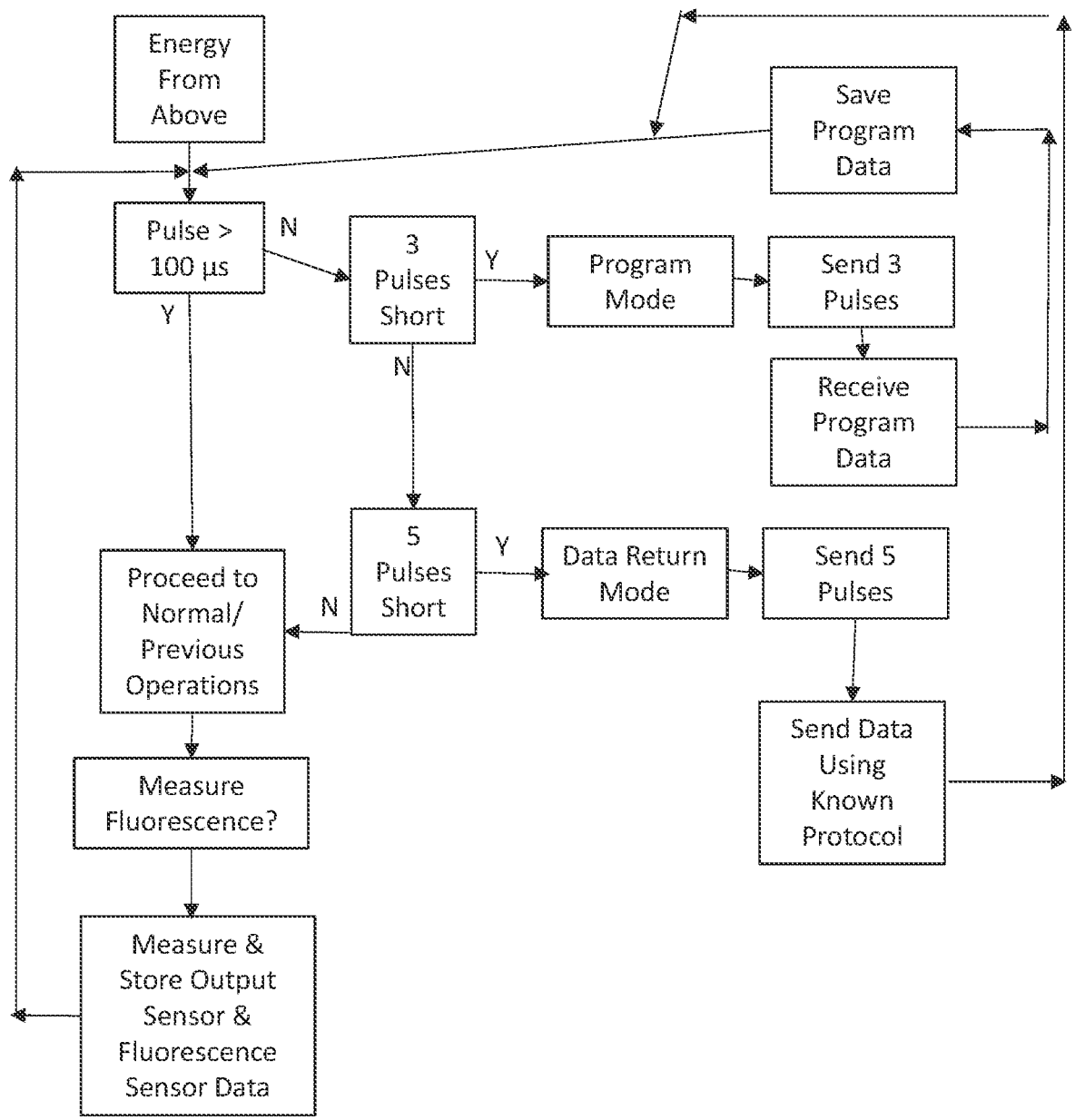
FIG. 8 is flowchart illustrating a control chart for downhole unit operation the LIBS system of FIG. 4.

FIG. 8 is a flowchart illustrating a control chart for downhole unit operation of the LIBS system in FIG. 4. In this method 800, starting at step 801 energy is received by the downhole LIBS system from cable 20. At Step 802 the method determines whether the pulse is greater than 100 microseconds. If yes, at step 803 it proceeds to normal operation. At step 804 the system measures the fluorescence of the excited molecules, and at step 705 measures and stores the output, sensor, and fluorescence data. If the pulse was shorter than 100 microseconds, the system proceeds to step 810 of determining whether a series of 3 short pulses were received. If 3 short pulses were received, at step 811 the system goes into programming mode. Programming mode initiates step 812 of sending 3 pulses through cable 382. Then at step 813 the method receives program data and proceeds to saving the program data 830.

If 3 short pulses were not received, the method proceeds to step 820 of determining if 5 short pulses were received. If yes, at step 821 the method returns data, at step 822 begins sending 5 pulses, and step 823 of sending data using a known protocol. The method 800 then resets.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

The invention claimed is:

1. A laser induced breakdown spectroscopy (LIBS) probe, comprising:
a topside control system comprising a pumping source;
an optical fiber, a pump beam transmitted through the optical fiber, wherein the optical fiber is connected to the topside control system and a downhole sensory system comprising:
a coupler connected to the optical fiber; a first lens, the first lens connected to the coupler, the first lens having a predetermined shape and a first lens coating, the first lens collimating the pump beam;
an actively Q-switched laser, the actively Q-switched laser coupled to a sensor which provides information to a computer that controls a high voltage pulser, the high voltage pulser providing a pulse to the actively Q-switched laser which can selectively cause the laser to pulse, resulting in high energy pulses;
and a second lens for focusing an output pulse such that it creates a plasma or spark.

2. The LIBS probe of claim 1 wherein the output pulse spark generated by the probe exceeds 20 mJ in output.

3. The LIBS probe of claim 1 wherein:
the actively Q-switched laser is Q-switched by a Pockels cell, which receives the pulse from the high voltage pulser.

4. The LIBS probe of claim 3 further comprising
a ¼wave plate adjacent to the Pockels Cell;
an output coupler adjacent the ¼wave plate; whereby the ¼wave plate, output coupler, alter the output of the Q-switched laser.

5. The LIBS probe of claim 1 wherein:
the first lens focuses a return signal generated from the output pulse onto the optical fiber.

6. The LIBS probe of claim 1 further comprising:
a third lens between the first lens and the Q-switched laser.

7. The LIBS probe of claim 6 further comprising:
a high reflectivity mirror between the third lens and the Q-switched laser.

8. A laser induced breakdown spectroscopy (LIBS) system comprising:
a topside control system comprising an optical pumping source connected to an optical fiber; and
a downhole LIBS probe comprising:
an adjustable focus lens arrangement connected to the optical fiber;
an actively Q-switched (AQSW) laser connected to the adjustable focus arrangement;
a sample area connected to at least a beam of the laser; and
a spectral emission control connected to at least one of the optical fibers and the optical pumping source;
a selective mirror located between the optical fiber and the actively Q-switched laser which selectively reflects a non-powering wavelength and directs an output to an AQSW control;
the AQSW control selectively activating the AQSW laser based on a non-powering wavelength sent from the optical pumping source, allowing for remote control of the AQSW laser's output, wherein the optical pumping source is part of a topside control system comprising the pumping source, a computer, a trigger, and a spectrometer for receiving information returned through the optical fiber.

9. The LIBS system of claim 8 wherein:
the spectrometer is an echelle spectrometer with sufficient resolution employed to resolve carbon isotope ratios.

10. The LIBS system of claim 8 wherein:
the spectrometer is a Czerny-Turner spectrometer with sufficient resolution employed to resolve carbon isotope ratios.

11. The LIBS system of claim 8 further comprising:
A second optical fiber, being a return fiber.

12. The LIBS system of claim 8 wherein the AQSW laser exceeds 20 mJ in output.

13. A method for operating an actively Q-switched laser induced breakdown spectroscopy (LIBS) probe, the method comprising:
starting a topside control unit connected to the LIBS probe by an optical fiber, wherein the LIBS probe is positioned downhole;
determining whether to use a previously loaded program;
determining whether to use a previously used pump level;
setting up a spectrometer to read information returned by the LIBS probe through the optical fiber;
determining pump frequency and duration;
pulse pumping to the LIBS probe;
generating high energy pulses at the LIBS probe, the pulses producing high energy plasma;
returning optical data on the higher energy plasma to the spectrometer through the optical fiber; and
producing a measurement.

14. The method of claim 13 further comprising:
entering and loading new Q-switch information into a program, and loading the new Q-switch information; and
entering and loading new pump level information into a program and loading the new pump levels.

15. The method of claim 13 further comprising:
determining whether the high energy pulse has a duration of greater than 100 microseconds.

16. The method of claim 13 further comprising:
determining whether the high energy pulse was 3 short pulses.

17. The method of claim 13 further comprising:
determining whether the high energy pulse was 5 short pulses.

18. The method of claim 13 further comprising:
resolving carbon isotope ratios located around the LIBS probe.

19. The method of claim 13 wherein the generated high energy pulses exceed 20 mJ in output.

* * * * *